P. F. FLAGGE.
MACHINE FOR MAKING EAVES TROUGHS.
APPLICATION FILED MAY 23, 1910.

1,117,177.

Patented Nov. 17, 1914.
4 SHEETS—SHEET 1.

Witnesses:

Inventor;
Phillip F. Flagge
By Winkler Flanders Bottum Fawsett
Attorneys.

P. F. FLAGGE.
MACHINE FOR MAKING EAVES TROUGHS.
APPLICATION FILED MAY 23, 1910.

1,117,177.

Patented Nov. 17, 1914.
4 SHEETS—SHEET 2.

Witnesses:
Fred Palm
Chas. L. Goss

Inventor:
Phillipp F. Flagge
By Winkler, Flanders, Bottum & Howsett
Attorneys.

P. F. FLAGGE.
MACHINE FOR MAKING EAVES TROUGHS.
APPLICATION FILED MAY 23, 1910.

1,117,177.

Patented Nov. 17, 1914.
4 SHEETS—SHEET 3.

Witnesses:
Fred Palm
Chas. L. Goss

Inventor:
Phillipp F. Flagge,
By Winkler Flanders Bottum & Fawsett
Attorneys.

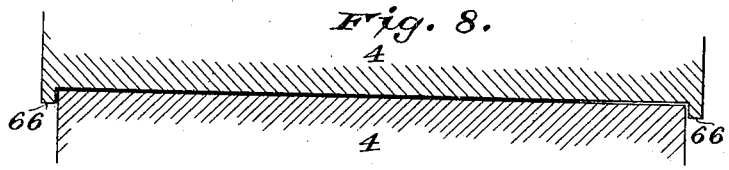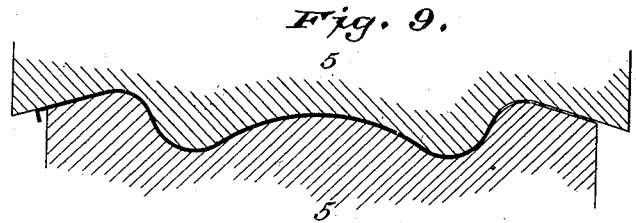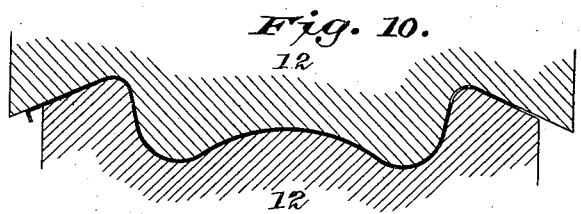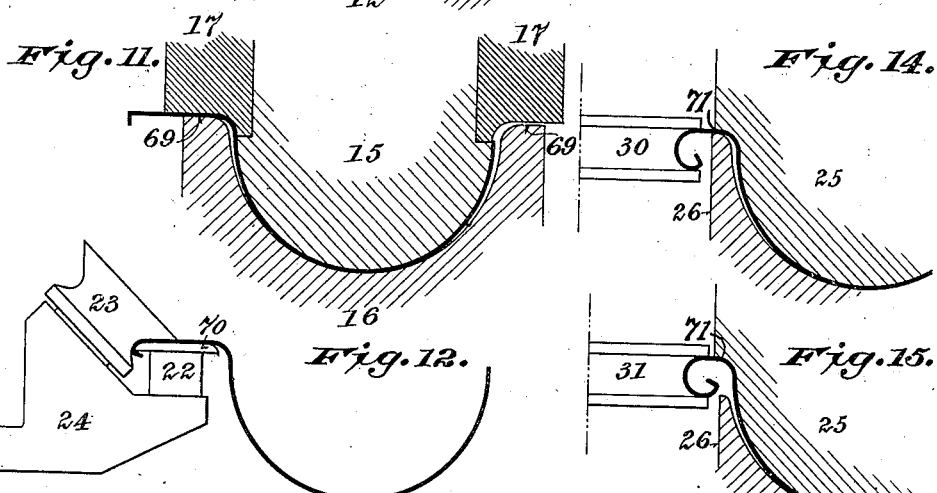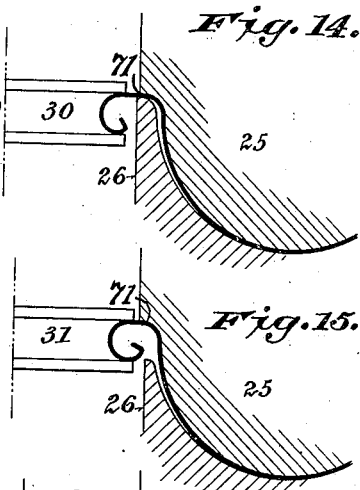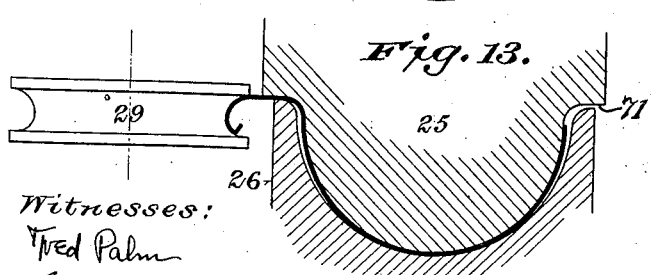

UNITED STATES PATENT OFFICE.

PHILLIPP F. FLAGGE, OF MILWAUKEE, WISCONSIN, ASSIGNOR TO MILWAUKEE CORRUGATING COMPANY, OF MILWAUKEE, WISCONSIN, A CORPORATION OF WISCONSIN.

MACHINE FOR MAKING EAVES-TROUGHS.

1,117,177.   Specification of Letters Patent.   Patented Nov. 17, 1914.

Application filed May 23, 1910. Serial No. 562,825.

*To all whom it may concern:*

Be it known that I, PHILLIPP F. FLAGGE, a citizen of the United States, residing at Milwaukee, in the county of Milwaukee and State of Wisconsin, have invented certain new and useful Improvements in Machines for Making Eaves-Troughs, of which the following is a specification, reference being had to the accompanying drawing, forming a part thereof.

The main objects of this invention are to facilitate and improve the manufacture of shaped sheet metal articles made in lengths, such as eavestroughs, and to improve the construction and operation of machines for making this class of articles.

It consists in the construction, arrangement and combination of parts as hereinafter particularly described and pointed out in the claims.

In the accompanying drawings like characters designate the same parts in the several figures.

Figure 1:
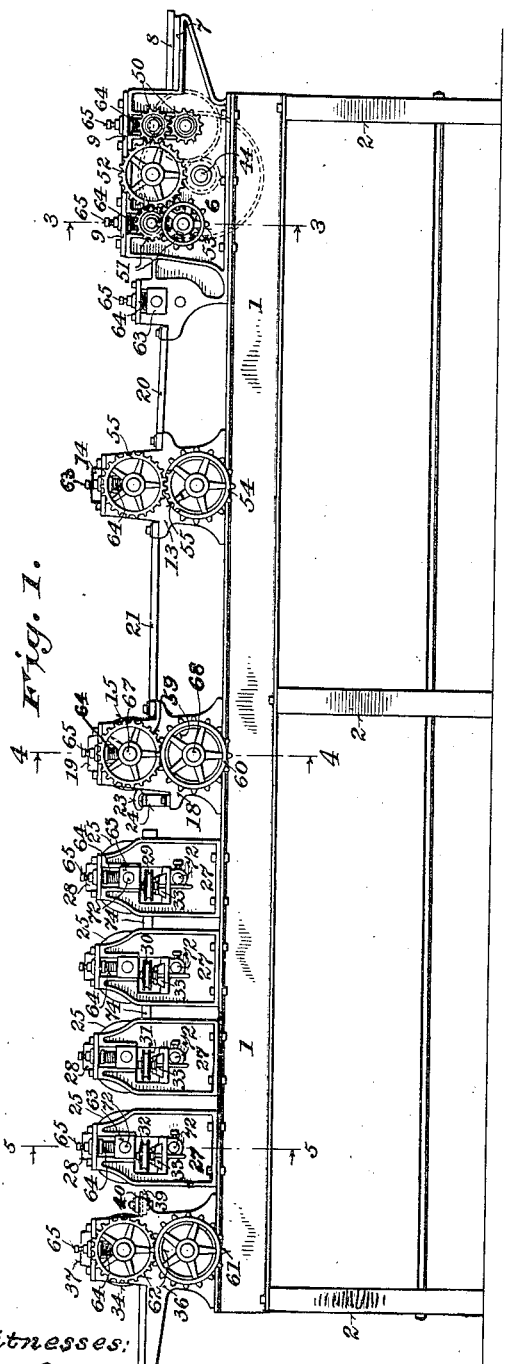
Figure 2:
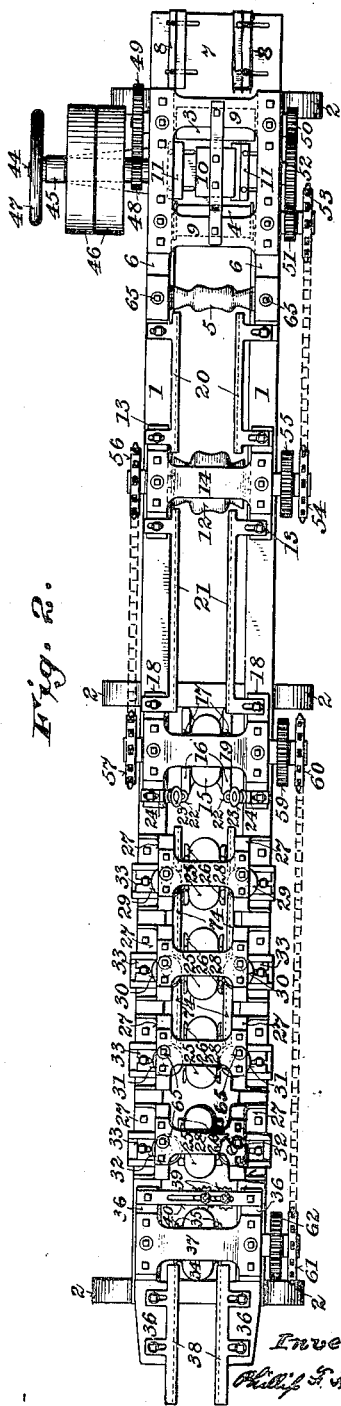
Figure 3:
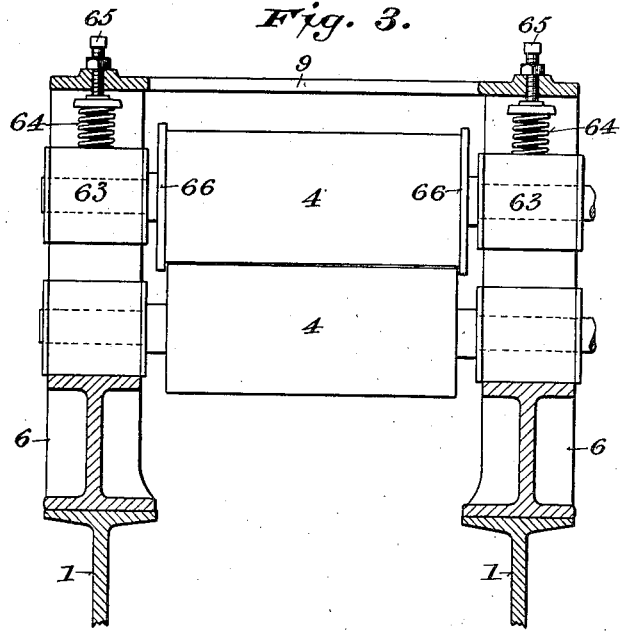
Figure 4:
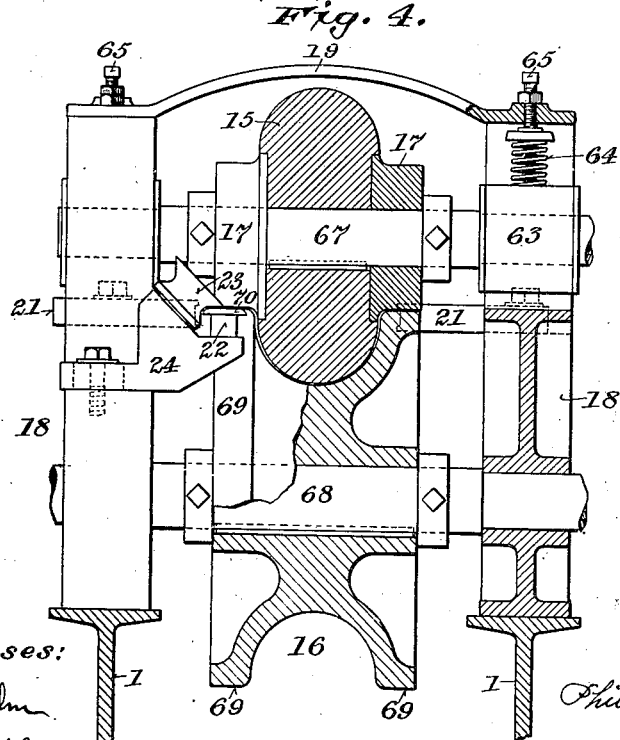
Figure 5:
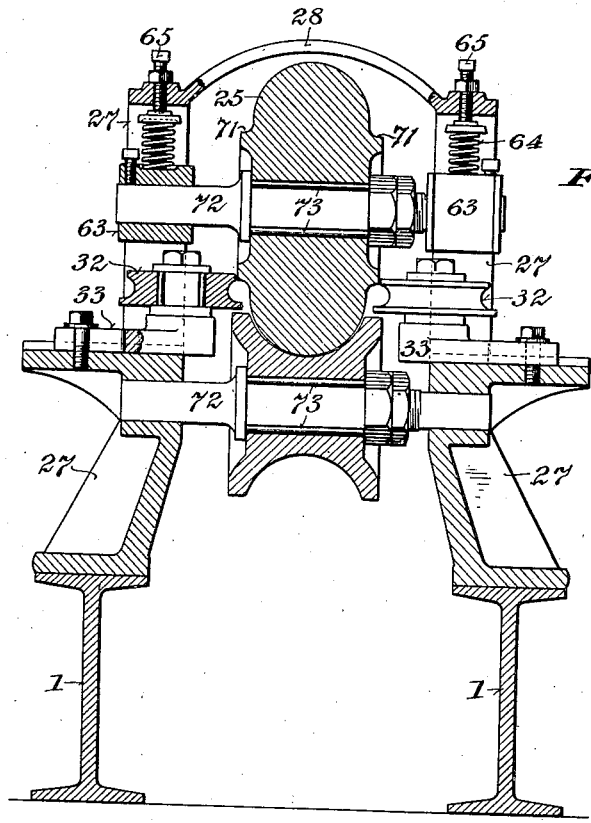
Figure 6:
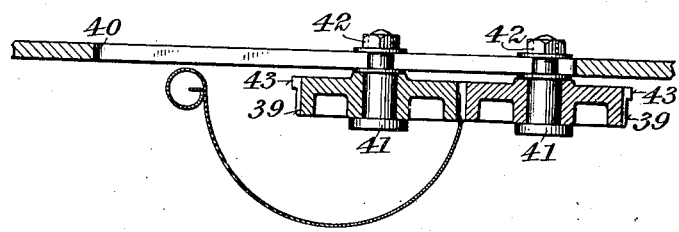
Figure 7:
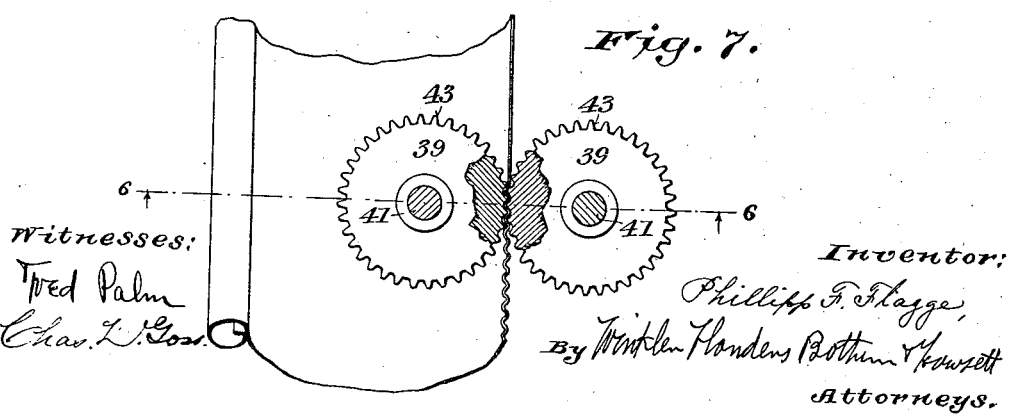

Figure 1 is a side elevation of a machine embodying the invention; Fig. 2 is a plan view of the same; Figs. 3, 4 and 5 are enlarged vertical cross sections on the lines 3 3, 4 4 and 5 5, Fig. 1; Fig. 6 is a vertical cross section on the line 6 6, Fig. 7, on a still larger scale, of crimping wheels adapted to form transverse crimps in one edge of the trough; Fig. 7 is a plan view of the same, the transverse supporting bar being omitted; and Figs. 8 to 16 inclusive, are enlarged cross sectional views showing the forms and relative arrangement of the flanging, breaking, shaping and beading rolls and illustrating the successive operations of the machine in forming eavestrough.

The frame of the machine may consist as shown, of a pair of parallel I-beams or rails 1, supported at suitable intervals by legs 2. At or adjacent to one end of the machine, a pair of feeding rolls 3, a pair of flanging rolls 4 and a pair of breaking rolls 5, are mounted in standards 6, which are fastened to the rails 1, forming the bed of the machine. At the same end of the machine a leaf or table 7 is provided, and upon this leaf or table are mounted two transversely adjustable guides 8 for supporting and directing the advance ends of sheet metal blanks in proper position to and between the feed rolls 3. The standards 6 are connected at the top by a cap plate having cross pieces 9, on which is mounted between the upper rolls 3 and 4, a guard 10 in position to direct the blanks as they pass from the feed rolls 3 between the flanging rolls 4. Transversely adjustable guides 11 similar to the guides 8 are provided between the rolls 3 and 4 for directing the blanks sidewise in proper position to be operated upon by the flanging rolls 4. After the breaking rolls 5, a pair of preliminary shaping rolls 12 is mounted in standards 13 fastened to the bed rails 1. The standards 13 are connected and braced at the top by a yoke or cross piece 14. Following the preliminary shaping rolls 12, a set of shaping rolls 15, 16 and 17 is mounted in standards 18 on the bed rails 1. The standards 18 are also connected and braced at the top by a yoke or cross piece 19.

Between the rolls 5 and 12, transversely adjustable guides 20 are mounted on projecting seats formed therefor on the standards 6 and 13, and in like manner, transversely adjustable guides 21 are mounted on the standards 13 and 18 between the rolls 12 and 15. As shown in Fig. 4, the guides 20 and 21 are formed on the inner sides with longitudinal grooves to engage with the edges of the partially formed blanks and to direct them properly to and between the rolls 12 and the rolls 15, 16 and 17. Adjacent to the shaping rolls 15 and 16 on the delivery side thereof, a pair of preliminary beading rolls 22 and 23 is mounted on a transversely adjustable bracket 24 on each side of the machine. After the shaping rolls 15, 16 and 17, a series of pairs of correspondingly shaped supporting and guiding rolls 25 and 26 are mounted in standards 27, which are bolted to the bed rails 1 and connected at the top by yokes or cross pieces 28.

With the several pairs of rolls 25 and 26 are associated at each end thereof, beading rolls 29, 30, 31 and 32 mounted in transversely adjustable brackets 33. These beading rolls are shaped and arranged as shown in Figs. 13 to 16 inclusive, to progressively turn a bead on one or both edges of a blank as it passes and is held between the rolls 25 and 26. After the last pair of rolls 25 and 26, a pair of driven delivery rolls 34 and 35, similar in shape to the rolls 25 and 26, is mounted in standards 36, which are fastened to the bed rails 1 and are connected and braced at the top by a yoke or cross piece 37. At the delivery end of the machine, transversely adjustable guides 38 are mounted on extensions of the standards 36 to give the proper direction to the trough section or other article and to hold it in place as it is discharged from the machine by the delivery rolls 34 and 35. Between the last pair of supporting and guiding rolls 25 and 26 and the delivery rolls 34 and 35, a pair of transversely adjustable removable crimping wheels 39 is carried by a cross bar 40 in position to form transverse stiffening crimps, as shown by Figs. 6 and 7, in one edge of a trough section or other article. As shown in Fig. 6, the wheels 39 are mounted to turn on studs 41, the reduced threaded stems of which pass through a longitudinal slot in the bar 40 and are clamped and held in place by nuts 42. The wheels 39 are formed or provided adjacent to their fluted or crimped peripheries with interengaging gear teeth 43, by which they are compelled to turn together, proper clearance is provided between the crimping teeth of the opposing wheels and the projections of the fluted or crimped face of one are presented opposite the corresponding grooves or depressions in the fluted or crimped face of the other, as shown in Fig. 7.

The rolls are driven and the blanks, trough sections or other articles are fed through and discharged from the machine by the following driving mechanism: A shaft 44 mounted in a bracket 45 on one side of the machine between and parallel with the rolls 3 and 4, is provided with tight and loose pulleys 46, for connecting it by a belt with a pulley on a driving shaft. The shaft 44 is provided with a hand wheel 47, for working the machine by hand, and is also provided with a gear 48 which meshes with a gear 49 on the shaft of the lower feed roll 3. On the opposite side of the machine the shafts of the two feed rolls are provided with and connected by gears 50, as shown in Figs. 1 and 2. The shaft of the upper flanging roll 4 is provided with a gear 51 meshing with a similar gear on the shaft of the lower flanging roll and also with an idle gear 52 which in turn meshes with the gear 50 on the shaft of the upper feed roll 3. On the same side of the machine with the gears 51, the shaft of the lower flanging roll 4 is provided with a sprocket wheel 53, which is connected by a link belt as shown in Fig. 2, with a similar sprocket wheel 54 on the shaft of the lower shaping roll 12. The shafts of the two rolls 12 are provided with and connected by gears 55 on the same side of the machine with the sprocket wheel 54. On the opposite side of the machine the shaft of the lower roll 12 is provided with a sprocket wheel 56, which is connected as shown in Fig. 2, by a link belt with a sprocket wheel 57 on the shaft of the roll 16. On the opposite side of the machine the shafts of the rolls 15 and 16 are provided with and connected by gears 59. The shaft of the roll 16 is also provided on the same side of the machine as the gears 59 with a sprocket wheel 60, which is connected by a link belt with a sprocket wheel 61 on the shaft of the lower delivery roll 35. The shafts of the two delivery rolls 34 and 35 are provided with and connected by intermeshing gears 62.

To allow for variations in the gage of the sheet metal from which the trough sections or other articles are made, and to enable the opposing rolls of the several pairs to work properly together, the journals or shafts of the upper rolls are mounted as shown in Figs. 1, 3, 4 and 5, in vertically movable boxes 63, yieldingly pressed downward toward the journals or shafts of the opposing rolls by springs 64, the tension of which is regulated by adjusting screws 65.

As shown in Figs. 3 and 8, the upper flanging roll 4 is formed or provided at the ends with peripheral rims or collars 66, which project over the ends of the opposing roll 4 and are adapted to turn a flange down at a sharp or abrupt angle on either edge or both edges of a sheet metal blank passing between them, as shown in Fig. 8, thereby stiffening the blank to facilitate feeding the same to the succeeding rollers and insuring the proper performance of subsequent operations.

As shown in Fig. 9 the breaking rolls 5 are shaped to fit together and to simultaneously form reversely curved longitudinal bends in the side and central portions of the blank and an outwardly and downwardly inclined plane marginal wing next to the outer bend on either side or each side of the blank. The lower roll is made somewhat shorter than the upper roll which overhangs it at the ends to clear the marginal flange or flanges formed on the blank by the rolls 4. The breaking rolls produce longitudinal bends in the blank which not only stiffen it so that it can be properly fed without warping or twisting to and between the succeeding rolls, but also break the metal by producing a reverse bend in the central portion of the blank so that it will more readily receive and retain the desired form which is imparted thereto by the succeeding rolls. As shown by Fig. 10, the next pair of rolls 12, or the preliminary shaping rolls, are similarly formed to the breaking rolls 5, but they are made to further bend the central upcurved portion of the blank and to draw the upcurved side portions closer together, imparting thereto sharper bends or curves of shorter radius, and forming at the junction of the upcurved side portion and the marginal wing on one or each side of the blank, a bend corresponding in curvature with that of the marginal bead or beads to be completed by subsequent operations.

Referring to Figs. 4 and 11, the driven shaping rolls 15 and 16 are keyed or otherwise fastened on the shafts 67 and 68, with which they turn. The upper roll 15 is formed with a convex working face or periphery corresponding in cross section with the final shape which is to be given to the trough or other article. The lower roll 16 is formed with a concave working face or periphery fitting the convex central portion of the face or periphery of the roll 15, and with outwardly projecting rims 69 which work with the peripheries of the opposing rolls 17 loosely mounted on the shaft 67 at the sides of the roll 15 to bend the outwardly and downwardly inclined wing or wings formed by the rolls 5 and 12 upwardly into a substantially horizontal position.

Referring to Fig. 12, the preliminary beading rolls 22 are mounted on approximately vertical axes or axes substantially at right angles to the axes of the rolls 15 and 16, while the coöperating rolls 23 are mounted on oblique axes. The upper ends of the rolls 22 which are presented to the under side of the laterally projecting marginal wings on the trough sections as they pass from the rolls 15, 16 and 17, are formed with overhanging heads or rims 70, having rounded margins, while the rolls 23 are formed with concave peripheral faces which fit over the overhanging heads or rims 70 of the rolls 22 and coöperate therewith to give the preliminary bend next to the downturned marginal flanges in the formation of the beads or rolls which are completed by the subsequent rolls 29 to 32 inclusive, coöperating with the associated supporting and guiding rolls 25 and 26. The outwardly projecting shoulders 71 at the sides of the convex faces of the rolls 25 are made progressively narrower, while the opposing rims at the sides of the concave faces of the two last rolls 26 are located at some distance from said shoulders, as shown in Figs. 13 to 16 inclusive.

As shown in Figs. 4, 5 and 11 to 16 inclusive, the rounded concave corners or coves in the rolls 17 and at the sides of the convex faces of the rolls 25, all correspond in curvature with the marginal bead or beads in the formation of which said rolls coöperate with the beading rolls; and clearance is provided between the opposing upper and lower rolls opposite and adjacent to said coves, such clearance gradually diminishing toward the central portions of the rolls.

As shown in Fig. 5, the supporting and guiding rolls 25 and 26 may be loosely mounted on fixed shafts 72 and provided with anti-friction roller bearings 73. Adjacent to the first three pairs of rolls 25 and 26, the machine is provided with guides 74 to direct and hold the work, trough sections or other articles, in proper position with relation to said rolls.

In the operation of the machine for making eavestrough or the like, if a bead or roll is to be formed on one edge only of the trough, and the other edge is to be crimped to give it the desired stiffness and stability, the guides 8, 11, 20, 21, 38 and 74, the beading rolls 22, 23, 29, 30, 31 and 32 and the crimping wheels 39 are adjusted as shown in the drawings, particularly by Fig. 2. The flat sheet metal blanks, which are cut to the required width, are fed between the guides 8 to the feed rolls 3, which force them forward underneath the guard 10 and between the guides 11 to the driven flanging rolls 4, which turn a flange down on one edge thereof, as shown by Fig. 8. From the flanging rolls 4 the blanks pass between the breaking rolls 5 by which the central and side portions are bent upwardly, and an outwardly and downwardly inclined wing is formed on the flanged side of the blanks, as shown by Fig. 9. From the rolls 5 the blanks pass between the guides 20 by which they are directed to and between the rolls 12. The rolls 12 as shown by Fig. 10, further depress the central portion of the blanks, imparting sharper bends or curves of shorter radius to them at the sides and drawing the upward bends at the sides toward each other. From the rolls 12 the partially formed trough sections pass between the guides 21 and are directed thereby to the shaping rolls 15, 16 and 17. These rolls bend the upturned middle portions of the sections down into their final concave shape, reversing the inner upward bends previously imparted thereto by the rolls 5 and 12. The rim 69 on one side of the roll 16 coöperating with the opposing roll 17, bends the flanged wing on that side of the trough section up to a horizontal position, as shown by Fig. 11. After the trough sections have been bent by the rolls 15, 16 and 17, from the shape imparted thereto by the rolls 12, shown in Fig. 10, into the shape shown by Fig. 11, the upcurved sides tend to approach each other and thus maintain the desired shape of the trough rather than to spread as they would if the upward bend were not given to the central portion of the blanks by the preliminary operations of the rolls 5 and 12 before attempting to impart the final shape thereto by the rollers 15, 16 and 17. Passing from the rolls 15, 16 and 17, the preliminary bend for forming the bead on the flanged edge of the blank is produced by the beading rolls 22 and 23, as shown by Fig. 12. The bead or roll is then gradually turned as the blank passes, and is held between the supporting and guiding rolls 25 and 26 by the rolls 29, 30, 31 and 32 operating successively thereon, as shown by Figs. 13 to 16 inclusive. The edges of the trough sections or other articles opposite the beads turned thereon, as above explained, passing between the wheels 39, as shown in Figs. 6 and 7, are transversely crimped and stiffened thereby.

The trough sections or other similar articles formed on this machine as hereinbefore explained, do not tend to spread or open up or to twist and warp, but permanently maintain their shape, and in this respect are superior to trough or similar articles as usually made heretofore by hand, or by such machines or tools as have hitherto been used for the purpose.

When the machine is adjusted for forming a bead or roll on one edge only of the trough sections or other articles, the beading rolls on the opposite side of the machine are inactive, but when beads or rolls are formed on both edges, both sets of beading rolls are brought into action, the guides being adjusted so that the edges of the blanks or sections passing between the rolls 4 will be flanged on both edges, and subsequently passing between the breaking, shaping and guiding rolls, will project at both ends thereof so as to be acted on by both sets of beading rolls.

While for the purpose of illustration and explanation, a machine particularly designed for the manufacture of eavestrough has been shown and described, by changes which will be apparent to those skilled in the art, the essential characteristics of the invention may be embodied in machines for making other similar articles from sheet metal.

I claim:

1. In a machine for making eavestrough and the like, the combination of breaking rolls having interfitting convex and concave portions and conical end portions adapted to simultaneously form in a sheet metal blank upwardly curved side portions with an upwardly bent intermediate bottom portion and an outwardly and downwardly inclined plane marginal wing, and shaping rolls having interfitting convex and concave portions and cylindrical end portions adapted to bend the upwardly bent intermediate bottom portion of the blank downward into final shape and to simultaneously bend the wing upwardly into a horizontal plane.

2. In a machine for making eavestrough and the like, the combination of breaking rolls having interfitting convex and concave middle portions and conical end portions adapted to simultaneously form in a sheet metal blank upwardly curved side portions with an upwardly bent intermediate bottom portion and outwardly and downwardly inclined plane marginal wings, and shaping rolls having interfitting convex and concave middle portions and cylindrical end portions adapted to bend the upwardly bent intermediate bottom portion of the blank in the reverse direction into final shape and to simultaneously bend the wings upwardly into a horizontal plane.

3. In a machine for making eavestrough and the like, the combination of flanging rolls adapted to turn a stiffening flange at an abrupt angle on a longitudinal edge of the blank, breaking rolls adapted to simultaneously form in the side and central portions of the flanged blank reversely curved bends, shaping rolls adapted to bend the central portion of the blank in the reverse direction into its final form, said breaking and shaping rolls being adapted to form a plane outwardly projecting wing between the flanged edge and curved portion of the blank, a series of pairs of opposing convex and concave supporting and guiding rolls, the concave rolls having outturned shoulders at one side of their concave faces, and beading rolls mounted on axes transverse to the axes of said supporting and guiding rolls and having concave peripheries presented toward and working with the supporting and guiding rolls where they come together.

4. In a machine for making eavestrough and the like, the combination of shaping rolls adapted to bend the body of the blank into the desired form, a series of pairs of correspondingly shaped interfitting concave and convex guiding and supporting rolls, the convex rolls having outwardly projecting and progressively narrowing shoulders at the base of their convex faces and a series of beading rolls arranged with their peripheries toward and adjacent to the meeting faces of said guiding and supporting rolls with which they coöperate to progressively turn a bead on one edge of the article.

5. In a machine for making eavestrough and the like, the combination of shaping rolls comprising a concave roll formed integrally with an outturned cylindrical rim having a rounded convex corner merging with the concave face of said roll, a convex roll fitting into the concave roll, and an independently revoluble roll coaxial with the convex roll and formed with a cylindrical face and rounded concave corner merging with the convex face of said convex roll, the cylindrical rim of the concave roll coöperating with the cylindrical face of the independently revoluble roll and clearance being provided between the rounded convex corner of the concave roll and the opposing rounded concave corner of the independently revoluble roll.

6. In a machine for making eavestrough and the like, the combination of shaping rolls comprising a concave roll formed integrally on each side of its concave face with an outturned cylindrical rim having a rounded convex corner merging with the convex face of said roll, a convex roll fitting into the concave roll, and independently revoluble rolls fitting into recesses in the sides of and coaxial with the convex roll and each formed with a cylindrical face and rounded concave corner merging with the convex face of said convex roll, the cylindrical rims of the concave roll coöperating with the cylindrical faces of said independently revoluble rolls and clearance being provided between the rounded convex corners of the concave roll and the opposing rounded corners of the independently revoluble rolls.

7. In a machine for making eavestrough and the like, the combination of breaking rolls adapted to simultaneously form in the side and central portions of the blank reversely curved bends, shaping rolls adapted to bend the central portion of the blank in the reverse direction and to form an outturned wing on one side thereof, a series of pairs of convex and concave supporting and guiding rolls, the convex rolls having outturned shoulders next to their convex faces and of progressively decreasing width toward the delivery end of the machine, and a series of beading rolls having concave peripheries presented toward and working with the supporting and guiding rolls where they come together to gradually turn the wing on the adjacent side of the blank into a bead.

8. In a machine for making eavestrough and the like, the combination of a pair of driven feed rolls, a pair of flanging rolls adapted to turn a stiffening flange at an abrupt angle on a longitudinal edge of the blank, a pair of breaking rolls having interfitting convex, concave and conical working faces adapted to simultaneously form in the side and central portions of the blank reversely curved bends and an outwardly and downwardly inclined plane wing next to the flanged edge of the blank, and opposing shaping rolls having interfitting convex and concave faces and cylindrical faces next to their convex and concave faces adapted to bend the central portion of the blank in the reverse direction into final shape and the wing upwardly into a horizontal plane.

9. In a machine for making eavestrough and the like, the combination of a pair of flanging rolls adapted to turn a stiffening flange at an abrupt angle on a longitudinal edge of the blank, opposing shaping rolls mounted on parallel axes and adapted to bend the body of the blank into the desired form and to guide and hold the same in position during the formation thereon of a rolled marginal bead, and a pair of opposing beading rolls adapted to give a preliminary bend to the flanged edge of the blank in the formation of the bead, one mounted on an axis substantially at right angles to the axis of the shaping rolls and having at its upper end an overhanging rounded rim and the other mounted on an axis oblique to the axes of the shaping rolls and having a concave periphery fitting and extending over the rounded rim of the opposing beading roll.

10. In a machine for making eavestrough and the like, the combination of shaping rolls mounted on parallel axes and comprising a concave roll having an outturned cylindrical rim or shoulder on each side of its concave face, a convex roll fitting into the concave roll and independently revoluble rolls coaxial with the convex roll and having cylindrical peripheries presented toward and coöperating with the rims or shoulders of the concave roll, a series of pairs of correspondingly shaped interfitting concave and convex guiding and supporting rolls, the convex guiding and supporting rolls having outwardly projecting and progressively narrowing shoulders at the base of their convex faces; and beading rolls mounted adjacent to the several pairs of guiding and supporting rolls on axes transverse thereto and coöperating therewith to progressively turn a roll or bead on the blank as it is held and passes between said guiding and supporting rolls.

11. In a machine for making eavestrough and the like, the combination of a series of pairs of interfitting concave and convex guiding and supporting rolls, the convex rolls having outwardly projecting and progressively narrowing shoulders at the base of their convex faces, and a series of concave beading rolls arranged adjacent to the ends and opposing working faces of the several pairs of guiding and supporting rolls on axes transverse to and adjustable toward and from them.

12. In a machine for making eavestrough and the like, the combination of a series of pairs of correspondingly shaped interfitting concave and convex guiding and supporting rolls having their axes parallel with one another, the convex rolls having outwardly projecting and progressively narrowing shoulders at the base of their convex faces, and a series of beading rolls having concave peripheries presented to and progressively approaching toward the delivery end of the machine the ends and opposing working faces of said guiding and supporting rolls and mounted on axes transverse to and adjustable lengthwise of said guiding and supporting rolls.

13. In a machine for making eavestrough and the like, the combination of a pair of flanging rolls adapted to turn a flange on a longitudinal edge of the blank, a pair of breaking rolls and a pair of preliminary shaping rolls adapted to form the upwardly curved sides of the trough with an intermediate upwardly bent bottom and a downwardly and outwardly inclined wing on the flanged side of the blank, a pair of shaping rolls adapted to simultaneously bend the middle portion of the trough downward and draw its curved sides toward each other into their final shape and to bend the lateral wing upward into a substantially horizontal plane, a series of pairs of convex and concave supporting rolls, the convex rolls having outwardly projecting substantially cylindrical shoulders next to their convex faces and of progressively diminishing width toward the delivery end of the machine, and a series of concave beading rolls mounted on axes transverse to the axes of the supporting and guiding rolls with their concave peripheries opposite the meeting faces of said supporting and guiding rolls and progressively closer to the same toward the delivery end of the machine.

In witness whereof I hereto affix my signature in presence of two witnesses.

PHILLIPP F. FLAGGE.

Witnesses:
  CHAS. L. GOSS,
  GEO. WEST, Jr.